C. ELLIS.
PROCESS OF MAKING WHITE HYDRAULIC CEMENT AND POTASH SALTS.
APPLICATION FILED JUNE 29, 1911.
1,224,454.
Patented May 1, 1917.
2 SHEETS—SHEET 2.
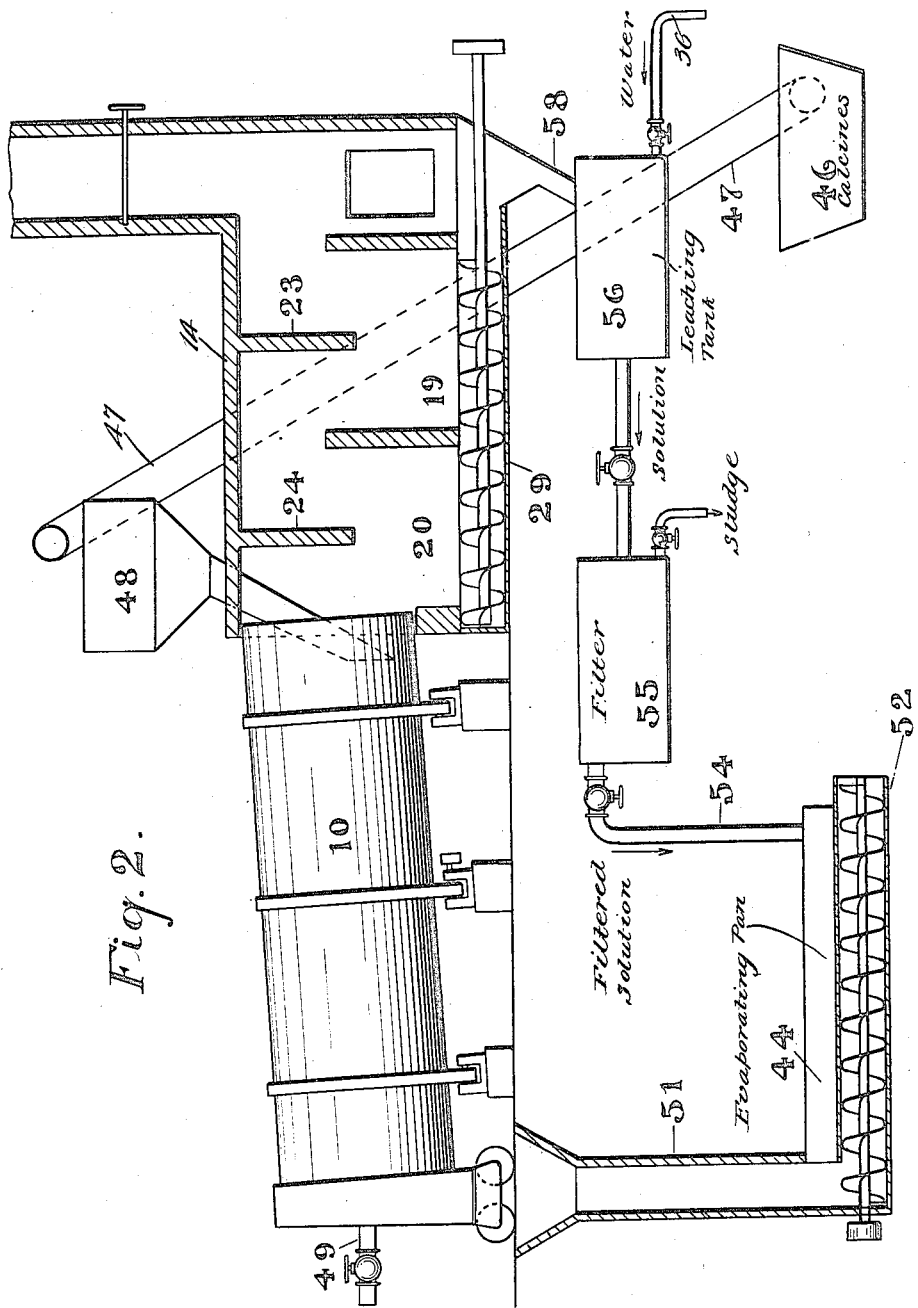

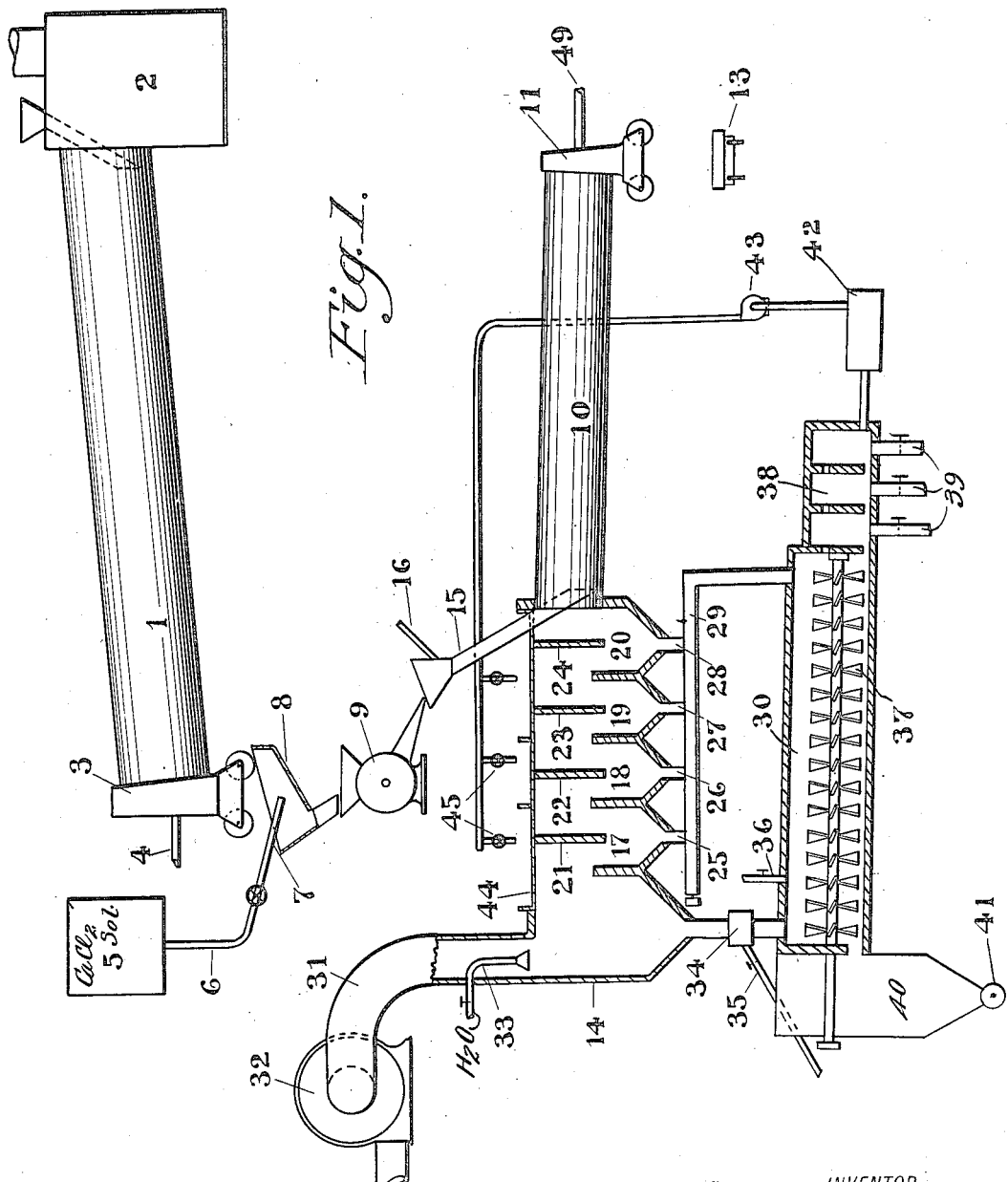

UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

PROCESS OF MAKING WHITE HYDRAULIC CEMENT AND POTASH SALTS.

1,224,454. Specification of Letters Patent. Patented May 1, 1917.

Application filed June 29, 1911. Serial No. 636,118.

*To all whom it may concern:*

Be it known that I, CARLETON ELLIS, a citizen of the United States, and a resident of Montclair, in the county of Essex and State of New Jersey, have invented certain new and useful Improvements in Processes of Making White Hydraulic Cement and Potash Salts, of which the following is a specification.

This invention relates to a process of simultaneously producing white Portland or other calcareous cement, and potash or potassium salts, and relates particularly to a method of treating potassium-bearing minerals in combination with lime or calcium carbonate or other calcareous material, for the production of cementitious bodies, with the simultaneous expulsion by the aid of heat, of a large proportion of the potassium originally contained in the raw material.

Feldspar is a double silicate of alumina and alkali. Being in a combined state, the silica is readily available for the purpose of cement making, and on heating with lime, it very easily combines therewith. It is apparently more susceptible to combination with lime than is clay or kaolin. For this reason feldspar is admirable source of silica for cement making. As the alkali acts as a powerful flux, the feldspar fuses readily at a temperature, in fact, of about 1300° C. Clay, on the other hand, fuses at 1800° C., or thereabout. Hence the combination of lime and silica in making cement from feldspar may be accomplished at a lower temperature than is ordinarily the case. Owing to the relatively small amount of alumina present in feldspar a cement may be prepared containing a lower percentage of calcium aluminate than is found in ordinary Portland cement, which is an advantage when cement is to be exposed to alkaline waters, or waters containing a large amount of soluble salts. In the use of feldspar, one part of silica introduces less than one-third of a part of alumina.

Pure orthoclase contains about 16% of potash (figured as $K_2O$), but as mined, the feldspar will run nearer 10% of potash, and in some cases even lower. For the purposes of the present invention it is desirable to use orthoclase running as high as possible in potash, but even with the lower percentages, the potassium compounds may be recovered to advantage.

It has been proposed heretofore to make use of feldspar in small quantity, as a flux in the manufacture of cement of the Portland type to reduce the time of burning, owing to the fluxing action of this material. As no means however have been provided for the removal of the potassium compounds, their presence in the cement were deemed undesirable, as it is believed that the alkali causes the cement to set too rapidly and to cause whitish excrescences on the surface of the resulting concrete (commonly called "efflorescence").

The present invention makes it possible to eliminate the major portion of the potassium from the feldspathic constituent thereby enabling the production of a sound cement which does not set with undue rapidity nor effloresce to an objectionable extent, and to recover potassium compounds as a by-product.

The present invention has particularly for its object as stated, the production of a white or light colored cement, and for this purpose the constituents required are from the commercial point of view, silica, alumina and lime, although special cements may be made which are very white in color, by using other bases to a greater or less extent, among these zinc oxid being especially valuable.

In its preferred embodiment, the invention involves the use of a chlorid such as calcium chlorid, so that by the interchange of chlorin, potassium chlorid may be produced and volatilized away from the cement material, and subsequently recovered. Calcium chlorid reacts easily with feldspar at a comparatively low temperature, producing potassium chlorid, while at the same time enters into combination with the silica. Potassium chlorid is however, not readily volatile at such low temperature as 1300° C., and a considerably higher heat is required to drive it from the cement mix. It has been proposed to treat potassium-containing cement-making material in a single rotary kiln, with the idea of expelling the potassium compounds and collecting them as a sublimate in the stack. When, however, the sublimed potassium salts reached the upper part of the kiln, and upon coming into contact with the cold raw material they were condensed. Therefore the potassium was not effectively removed from the material and a large proportion appeared in the cement clinker, giving rise, under some circumstances to a very inferior grade of cement.

In the present invention, a sectional kiln may be used, so that calcining may be accomplished in one section, at a relatively low temperature and the clinkering operation carried out in a second section at a much higher temperature. The calcium chlorid or other reacting salts may be mixed with the raw material before or after it is calcined. For example, I may pass the material through a calcining zone, spray with a solution of calcium chlorid to quench the hot calcines, grind this material to a fine powder and introduce it into the clinkering zone, where it is quickly subjected to a high temperature, thereby volatilizing the potassium chlorid in such an effective way that it is almost completely removed from the cement mix and its volatilization becomes so rapid that it is taken up by the current of gases and carried out of the kiln without substantial loss by sublimation and condensation on the walls of the kiln. The gases coming from the clinkering kiln may be at once treated to remove the potassium chlorid, as for example by washing.

In the accompanying diagrammatic drawings, Figure 1, shows a calcining and clinkering kiln in elevation with potash extraction apparatus in section. Fig. 2 shows a single kiln with apparatus for extraction of the potassium compounds from the fumes, etc., the kiln being shown in elevation and the extraction apparatus in section. Like parts are represented by similar numerals in these drawings.

Referring to Fig. 1, a rotary calcining section is shown at 1. This has the stack housing 2, and the hood 3. A fuel pipe 4 serves for the admission of powdered coal, oil, producer gas, or other fuel. 5 is a tank, containing a solution or suspension of calcium chlorid or sulfate, magnesium chlorid or equivalents thereof. An outlet pipe 6 terminates in a spray nozzle in the neighborhood of the spraying incline 8. 9 is a grinder. A rotary clinkering section is shown at 10, and this is provided with the hood, 11, chutes 12 and conveyer 13. The housing 14 of the clinkering section supports a conveyer chute 15, having an auxiliary conveyer branch, 16. The housing is provided with the dust pockets 17, 18, 19 and 20, and with the baffles 21, 22, 23 and 24. The pockets have the outlets 25, 26, 27, 28, communicating with a conveyer 29, leading to the extraction apparatus 30. The gases from the kiln are passed through the pipe 31 by means of the exhausting apparatus 32. A water sprayer is provided at 33.

The liquid produced by absorption of the potassium salts, by the water from sprayer 33, may flow by the vertical pipe into the extraction apparatus 30, or may be separately withdrawn through pipe 35 for separate treatment. Water, for extraction of the flue dust is introduced at 36, the solution passing into the boxes 38, whence it may be drawn off through one of the several pipes 39, or it may flow to tank 42. The extracted sludge is dumped into tank 40, whence a conveyer carries the same away back to the kiln 1 or the kiln 10. The liquor from the extractor 30 may be conveyed by pump 43 to evaporating pans 44, where it will be evaporated to dryness. The solution from pipe 35 may be evaporated to dryness, after filtration if so desired, for the production of potassium salts.

In the operation of this illustrative form of the process, the hydraulic cement raw mixture, containing potassium-bearing mineral, more particularly orthoclase is introduced into the calcining section 1. If limestone is used in large quantity, this alone may be entered into the calcining section 1. Here the mixture is calcined and substantially freed from carbon dioxid, but no material amount of the potassium compounds are here volatilized. It is discharged on to the spraying incline 8, where sufficient of the calcium chlorid solution is added to quench the material preparatory to grinding and also to introduce sufficient calcium chlorid to furnish the chlorin equivalent for the potassium. This amount depends upon the potash ($K_2O$) content of the mixture and ordinarily about 10% of calcium chlorid in excess of that required to combine with the potassium should be employed. The mixture becomes dry from evaporation of the water due to the heat of the calcines and may then be entered into the grinder 9. From the grinder the material goes to the conveyer 15, and at this point other materials may be added if desired, through the conveyer 16. In practice, a special mixing arrangement should be used for combining the two materials, but this is omitted from the drawings for the sake of simplicity of illustration. The mixture discharges into the clinkering kiln 10, where it is subjected to a clinkering heat. The potassium chlorid which forms passes with more or less flue dust, into the housing 14, and the major portion (of course including the heavy part or coarser dust) is entrained by the baffles and removed by the conveyer system to the extraction apparatus 30. A further portion of the potassium is removed by the sprayer 33, and may also enter the extraction apparatus or be separately treated. The solution of potassium compounds, after separation from the insoluble matter is carried to the evaporating pans 44, where it is reduced to a dry form. The extraction apparatus 14 may be placed at the upper end of the calcining section 1, if desired, and the potassium compounds collected at this point. Under these circumstances, the sections 1 and 10, may be joined end to end, so that the gases and products of combustion, formed in the kiln 10, pass directly into the section 1, and the heat of these gases utilized for calcining the raw material, as in my Patent 1,001,582, a suitable collecting hood and extraction apparatus being connected to the upper end of the kiln.

In Fig. 2, calcines from any suitable calcining furnace are introduced into the receptacle 46, and elevated by the conveyer 47, to the hopper 48. They are then introduced into the clinkering section 10, which is supplied with a flame from fuel entered by the burner 49. In this case, baffles 23 and 24 are also provided in the housing, and a conveyer 29 for the removal of the sublimate. A modified form of extraction apparatus is shown. The sublimate falls through hopper 58 into leaching tank 56, being there treated by water from pipe 36, the solution passing to and through filter 55, through pipe 54 into evaporating pan 44, heated by the hot cement in conveyer 52. Before the calcines enter the section 10, they are treated with calcium chlorid, e. g. in the receptacle 46, or hopper 48 similarly as in the apparatus of Fig. 1.

A stationary kiln employed for calcination is not here shown, but may be any of the standard types of shaft lime-kilns, or stationary Rosendale cement kilns.

In forming a cement mix, feldspar, kaolin, limestone, chalk, marl, clay, lime sludges and wastes, zinc oxid or carbonate, barium oxid and carbonate, magnesium oxid and carbonate, dolomite, gypsum, cryolite, fluospar and the like may be employed. In ordinary Portland cement, it is necessary to keep the proportion of magnesia below two or three per cent., while in the white cement made under the present procedure, a large proportion of magnesia may be introduced without detriment to the cement, and in fact, actually improving its color. Magnesia also serves as a carrier of chlorin from calcium chlorid to basic potassium compounds. Magnesia also may be introduced in the form of magnesium chlorid, which is more easily decomposed by heat than calcium chlorid. A white cement, requires the use of materials which are substantially free from iron compounds and other discoloring agents.

The entire operation of the calcining and clinkering stages and the driving off of the potassium chlorid may be done in a single kiln, as for example, in the apparatus shown in Fig. 2.

What I claim is:—

1. A process of producing cement and soluble potassium compounds which comprises (a) heating a mixture including a potassium-containing silicate mineral and a calcareous agent, to a temperature below the volatilizing temperature of the potassium compounds contained therein, (b) quenching the heated mixture with a liquor containing a salt of an acid which produces a soluble and comparatively easily volatile salt with potassium, (c) rapidly heating the so obtained product, in a sub-divided condition, to a clinkering temperature and thereby producing a cement clinker and volatilizing the potassium in the form of a relatively volatile salt, and (d) then separating said volatilized potassium salt from the gases present.

2. A process of producing cement and soluble potassium compounds which comprises (a) heating a mixture including a potassium-containing silicate mineral and a calcareous agent, to a temperature below the volatilizing temperature of the potassium compounds contained therein, (b) quenching the heated mixture with a solution of calcium chlorid, (c) rapidly heating the so obtained product, in a sub-divided condition, to a clinkering temperature and thereby producing a cement clinker and volatilizing the potassium in the form of a relatively volatile salt, and (d) then separating said volatilized potassium salt from the gases present.

Signed at Montclair, in the county of Essex and State of New Jersey, this 9th day of June, A. D. 1911.

CARLETON ELLIS.

Witnesses:
BIRDELLA M. ELLIS,
NATHANIEL L. FOSTER.